(12) United States Patent
Jerger et al.

(10) Patent No.: US 10,408,340 B2
(45) Date of Patent: Sep. 10, 2019

(54) MULTI-SPEED AUTOMATIC VEHICLE TRANSMISSION

(71) Applicant: JAGUAR LAND ROVER LIMITED, Warwickshire (GB)

(72) Inventors: Rob Jerger, Coventry (GB); Craig Percy, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 346 days.

(21) Appl. No.: 15/318,688

(22) PCT Filed: Jun. 23, 2015

(86) PCT No.: PCT/EP2015/064108
§ 371 (c)(1),
(2) Date: Dec. 14, 2016

(87) PCT Pub. No.: WO2015/197614
PCT Pub. Date: Dec. 30, 2015

(65) Prior Publication Data
US 2017/0122430 A1   May 4, 2017

(30) Foreign Application Priority Data
Jun. 23, 2014 (GB) .................... 1411122.3

(51) Int. Cl.
| | | |
|---|---|---|
| *F16H 59/66* | (2006.01) | |
| *F16H 61/02* | (2006.01) | |
| *B60R 1/00* | (2006.01) | |
| *G01S 13/88* | (2006.01) | |
| *G01S 17/88* | (2006.01) | |

(52) U.S. Cl.
CPC ........... *F16H 61/0213* (2013.01); *B60R 1/00* (2013.01); *F16H 59/66* (2013.01); *B60R 2300/8086* (2013.01); *B60Y 2400/3015* (2013.01); *B60Y 2400/3017* (2013.01); *F16H 2059/663* (2013.01); *F16H 2061/023* (2013.01);
(Continued)

(58) Field of Classification Search
None
See application file for complete search history.

(56) References Cited

U.S. PATENT DOCUMENTS

| | | | |
|---|---|---|---|
| 4,854,194 A | | 8/1989 | Kaneko et al. |
| 6,106,434 A | * | 8/2000 | Ibamoto .................. F16H 59/66 477/118 |

(Continued)

FOREIGN PATENT DOCUMENTS

| | | |
|---|---|---|
| CN | 102797837 | 11/2012 |
| DE | 10 2009 013176 A1 | 9/2010 |

(Continued)

OTHER PUBLICATIONS

Combined Search and Examination Report under Sections 17 and 18(3) for Application No. GB1411122.3 dated Dec. 19, 2014.
(Continued)

*Primary Examiner* — Justin Holmes
(74) *Attorney, Agent, or Firm* — Carlson, Gaskey & Olds

(57) ABSTRACT

A vehicle (10) has an automatic multi-speed transmission. For starting from rest a launch ratio is selected by a slope and/or obstacle device (13, 15) according to identification of an up-slope (12), a down slope, or an obstacle (17, 18).

20 Claims, 1 Drawing Sheet

(52) U.S. Cl.
CPC ...... *F16H 2061/0227* (2013.01); *G01S 13/88* (2013.01); *G01S 17/88* (2013.01)

(56) References Cited

U.S. PATENT DOCUMENTS

| | | | |
|---|---|---|---|
| 6,199,001 B1* | 3/2001 | Ohta | B60K 31/0058 701/409 |
| 2004/0249542 A1* | 12/2004 | Murasugi | F16H 61/0213 701/51 |
| 2006/0088190 A1* | 4/2006 | Chinomi | B60R 1/00 382/104 |
| 2008/0059032 A1* | 3/2008 | Hofmann | B60K 6/48 701/55 |
| 2010/0010715 A1 | 1/2010 | Inoue | |
| 2013/0040781 A1 | 2/2013 | Mair | |
| 2013/0271608 A1* | 10/2013 | Hiei | B60R 1/00 348/148 |
| 2014/0118550 A1* | 5/2014 | Yoon | B60R 1/00 348/148 |
| 2015/0202939 A1* | 7/2015 | Stettner | B60R 21/0134 701/37 |

FOREIGN PATENT DOCUMENTS

| | | |
|---|---|---|
| EP | 2090487 A1 | 8/2009 |
| EP | 2527691 A1 | 11/2012 |
| GB | 2357159 A | 6/2001 |
| JP | S62194961 | 12/1987 |
| JP | H09144869 A | 6/1997 |
| JP | 2002524708 | 8/2002 |
| WO | 02/055909 A1 | 7/2002 |

OTHER PUBLICATIONS

International Search Report and Written Opinion of the International Searching Authority for International application No. PCT/EP2015/064108 dated Sep. 30, 2015.
Supplemental Search Report for CN Application No. 201580033348.3, dated Nov. 7, 2018.

* cited by examiner

MULTI-SPEED AUTOMATIC VEHICLE TRANSMISSION

TECHNICAL FIELD

This invention relates to a multi-speed vehicle transmission with automatic selection of speed ratio, and to a means and method of selecting a speed ratio appropriate to movement from rest. Aspects of the invention relate to a launch control system of a vehicle automatic transmission, a method of selecting a launch speed ratio in a vehicle automatic transmission, a controller for a vehicle automatic transmission, a computer program, and a vehicle.

BACKGROUND TO THE INVENTION

Multi-speed automatic vehicle transmissions are well-known. In such a transmission a plurality of speed ratios are independently selectable under the command of a control system reliant upon, for example, vehicle speed and accelerator pedal position. In order to improve fuel economy the number of forward speed ratios may exceed eight. A large number of speed ratios also allows for an appropriate speed ratio in the event of a significant change in vehicle mass due to loading thereof, and for towing.

In benign circumstances, for example on a level road in good weather, an automatic transmission may start from rest in a speed ratio which is not the lowest speed ratio. Starting from rest in second or third speed ratio may be well within vehicle capabilities, and may improve the launch feel of the vehicle by reducing the number of speed ratio changes as the vehicle approaches highway speed. Such a technique may also improve vehicle fuel economy.

In for example a torque converter automatic transmission with eight forward speeds, launching from second or third speed ratio is more comfortable because there is a lower gain between throttle response and the delivery of torque to the driving wheels. In other words greater movement of the accelerator pedal is provided for a given response of the engine, and sudden pedal movements are masked. Also roll-out downshifts (zero accelerator pedal position) may be smoother if the lowest speed ratios are avoided—thus the shift shock of a downshift from second to first speed ratio may be obviated.

It is also known to provide special transmission shift maps in adverse weather or ground conditions. For example in ice and snow a transmission may start from rest in a higher speed ratio to minimize the risk of wheel spin, and the same technique may be used in muddy or wet conditions, for example when travelling off-road.

The appropriate shift map may be selected automatically without intervention of the driver; for example an external temperature sensor may lock out the lowest forward speed ratio(s) if air temperature drops below 0° C.

Systems of selecting one of several speed ratios for launch are generally insensitive to road gradient or obstacles such as kerbs or rocks, and in consequence starting from rest may be problematic if the transmission control system selects a shift map which provides for launch in a higher speed ratio. Typically, in such circumstances, the vehicle driver presses the accelerator pedal further, and eventually the transmission control system recognizes that a shift map with a lower launch speed ratio is appropriate. The transmission downshifts at a relatively high engine torque, which may be uncomfortable for the vehicle occupants.

It would be desirable to provide for selection of an appropriate launch ratio in a manner which is not noticeable to the vehicle driver, so that a normal range of accelerator pedal movement is better maintained.

SUMMARY OF THE INVENTION

According to a first aspect of the invention there is provided a method of selecting a launch speed ratio in a vehicle automatic transmission having a plurality of selectable speed ratios, the method comprising:
determining the presence of a slope and/or the presence of an obstacle, in the path of the vehicle, in dependence on an output of a slope and/or obstacle sensing device on the vehicle looking in a direction of intended travel, and
selecting a launch speed ratio appropriate to the determined slope and/or obstacle.

It will be understood that in this context the term 'looking' (and similar terms such as 'look') are not necessarily intended to be limiting in the sense of visual perception—where visible spectrum cameras are used 'looking/look' may be interpreted in this way, but where other sensors are used (ie: RADAR, LIDAR, ultrasonic sensors, etc), the term is to be taken as intended to cover the sensing or perception action of these articles.

By 'launch ratio' is meant the speed ratio selected by the transmission control system for starting from rest. The selected launch ratio may be incorporated in one of a plurality of transmission shift maps which determine shifting behaviour of the transmission according to circumstances of use. Accordingly the invention also comprises selecting a transmission shift map having a launch speed ratio appropriate to the detected slope or obstacle.

The method of the invention allows for recognition of a slope (up or down) or an obstacle such as kerb or rock, to the intent that a lower launch speed ratio is selected where the vehicle must climb on initial movement. A lower launch speed ratio may also be selected if a steep descent is recognized, but a higher launch speed ratio may be selected if a slight descent is recognized.

Within the scope of the invention is considered to be an obstacle comprising a snow or mud bank, for example provided by a deep overnight snow fall or by a vehicle sinking in soft ground.

The method may include the step of automatically selecting a forward facing sensing device, or a rearwards sensing device dependent upon the direction of intended travel, as indicated by for example, a transmission shift selector. Such a selector may have the usual DRIVE (D) position for forward motion and REVERSE (R) position for rearwards motion. The method may include activating a forward or rearward sensing device in dependence on a signal indicating which one of forward and reverse motion is selected by a transmission shift selector.

The method may further include selecting one of several modes of operation of the sensing device so that slope and obstacle recognition is employed only prior to vehicle launch. In other circumstances the sensing device may have other modes of operation, for example platooning, emergency brake application or for supplementing forwards or reverse vision for the vehicle driver.

Any suitable slope and/or obstacle sensing device may be used. For example a stereo camera may capture images or features within a field of view, and a computer processor may analyze such images to determine the presence of a slope or an obstacle. Slope may for example be determined by reference to an artificial horizon. Object recognition techniques may be used to recognize kerbs, rocks or other obstacles in the vehicle path. The same device may have other modes of operation when not used for vehicle launch.

A camera device may operate in the visible spectrum.

Devices such as infra-red cameras, cameras which utilize movement of the vehicle to improve image recognition, scanning RADAR systems and scanning LIDAR systems may also be used to recognize slopes and/or obstacles.

The method may include reverting to a standard shift map when the vehicle exceeds a predetermined forward speed, for example 10 kph. In reverse, the selected launch ratio may be held regardless of vehicle speed.

In an embodiment of the invention, the selected launch ratio may be provided by one of several sets of speed ratios.

In some circumstances, for example in a vehicle adapted for both on-highway and off-highway use, the vehicle transmission may have a high and a low range of speed ratios. The method of the invention may include selecting low range upon detection of a slope or an obstacle, thereby implementing a lower launch speed ratio.

The vehicle may be adapted to Hill Descent Control (HDC) or the like whereby automatic control of engine and transmission provides for vehicle descent without driver input to the accelerator pedal. The method of the invention may include selecting a HDC system in appropriate terrain or on an appropriate down slope.

The method of the invention may be influenced by vehicle settings, which may be determined manually or automatically. For example a vehicle may have a plurality of terrain settings whereby characteristics of vehicle performance are adapted to different types of terrain or weather conditions. Such settings may include 'ICE and SNOW', MUD; SAND; 'ROCK' and 'HIGHWAY' or the like. Thus the method of the invention may include detecting a terrain setting of the vehicle, and selecting a sub-set of transmission shift maps from which said launch speed ratio is selected.

The method of the invention may comprise a determination of the severity of the slope or obstacle, and selecting one of several launch ratios other than a standard launch ratio according to said severity.

For example, a standard launch ratio may be third speed ratio for flat level ground, and the invention may provide for the launch speed ratio, for example second or first speed ratio, to be selected according to a severity threshold commensurate with the detected slope or obstacle. The severity threshold may change according to a terrain setting of the vehicle.

The method may comprise providing on the vehicle the slope and/or obstacle sensing device looking in the direction of intended travel.

According to a second aspect of the invention there is provided a launch control system of a vehicle automatic transmission having a plurality of selectable speed ratios, said system comprising a plurality of transmission shift maps defining two or more launch speed ratios, a slope and/or obstacle sensing device adapted to look in the direction of intended travel and having an output, and one or more computer processors adapted to determine from said output the presence of a slope or an obstacle, and adapted to select a shift map appropriate to the detected slope or obstacle.

The plurality of transmission shift maps may be provided in a read only memory, or may be determined in real-time according to an algorithm of said one or more processors.

The sensing device may be a stereo camera, and the processor may include software adapted to process images from said stereo camera to identify slope according to an artificial horizon, and to identify obstacles according to an object recognition program.

The process may be further adapted to determine the value of a slope, and/or the height of an obstacle, and to select an appropriate shift map according to one or more thresholds of slope and/or obstacle height.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "vehicle control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

According to a further aspect of the invention there is provided a computer program which, when run on a processor, causes one or more of the methods described herein to be performed.

According to a further aspect of the invention there is provided a non-transitory computer readable medium storing a computer program comprising computer program instructions, that, when performed by one or more processors, causes one or more of the methods described herein to be performed.

According to a further aspect of the invention there is provided an apparatus comprising: at least one memory storing computer program instructions; and at least one processor configured to execute the computer program instructions to cause the apparatus at least to perform one or more of the methods described herein.

According to a further aspect of the invention there is provided a controller, for a vehicle automatic transmission having a plurality of selectable speed ratios, adapted to carry out one or more of the methods described herein.

The invention also comprises a vehicle having an automatic transmission adapted to the method and system of the invention, and to such a vehicle having a forward and/or rearward facing camera device adapted to provide information concerning slope and obstacles in the path of intended vehicle travel.

According to embodiments of the invention there may be provided a method of selecting a launch speed ratio in a vehicle automatic transmission having a plurality of selectable speed ratios, the method comprising providing on a vehicle a slope and/or obstacle sensing device looking in the direction of intended travel, determining the presence of a slope or the presence of an obstacle, in the path of the vehicle, and selecting a launch speed ratio appropriate to the determined slope or obstacle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only with reference to the accompanying drawings in which.

DESCRIPTION OF EMBODIMENTS

Figure 1:
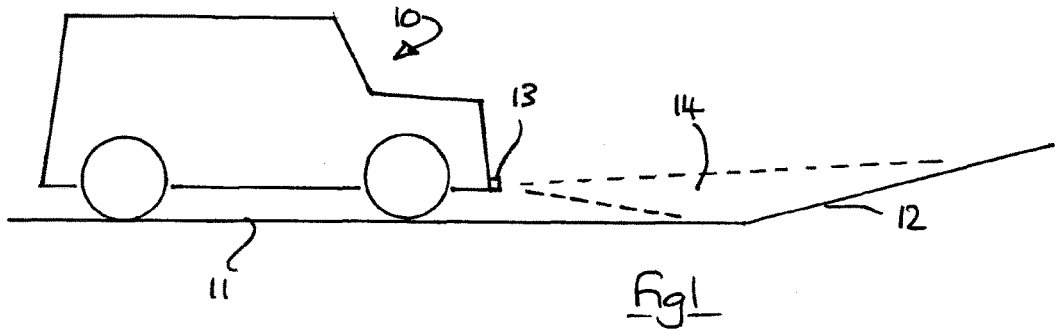
FIG. 1 illustrates schematically a vehicle with forward facing camera device and an up gradient.

With reference to FIG. 1, a vehicle 10 is at rest on a level ground surface 11, and facing an up gradient 12. The vehicle has a forward facing camera device 13 having a field of view 14. As will be explained in more detail, the camera output is capable of being processed to recognize the up gradient 12 and to determine whether the up gradient exceeds one or more successive thresholds which may be appropriate to a lower pre-determined launch speed ratio of the vehicle transmission. The selected launch speed ratio may reduce as the up gradient increases, provided that still lower speed ratios are available for selection in the transmission.

The camera device may also recognize a down gradient, and if appropriate select a higher launch ratio for a slight down gradient, but a lower launch ratio for a severe down gradient. A moderate down gradient may be suitable for a standard launch ratio, the selected launch ratio being determined by one or more gradient thresholds.

Although the vehicle of FIG. 1 is illustrated on level ground, it may alternatively be on a gradient, and the output of the camera device is capable of being processed to recognize a continuance of that gradient or a change in that gradient. The output of the camera device may of course indicate level ground ahead.

Figure 2:
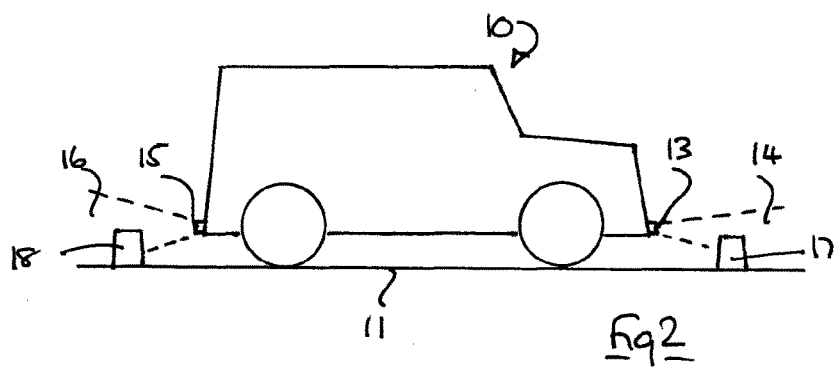
FIG. 2 illustrates schematically a vehicle with forward and reverse facing camera devices, and fore and aft kerbs.

FIG. 2 illustrates a similar vehicle 10 at rest. The vehicle has a forward facing camera device 13 and a rearwards facing camera device 15 having a field of view 16. Respective kerbs 17, 18 are in the respective fields of view, and the output of the camera device is capable of being processed to recognize the kerbs 17, 18, and in one embodiment the height of the respective kerbs above the ground surface 11. According to appropriate thresholds, of for example, kerb height, the transmission controller selects a corresponding launch ratio to enable the kerb to be climbed without excessive accelerator pedal movement.

Although illustrated on level ground in FIG. 2, the vehicle could alternatively be at rest on an up-slope or a down slope.

The camera devices 13, 15 may be operative whenever the vehicle is in an 'ignition on' condition, or may be selectively operable according to the direction of intended travel, as indicated by a forwards and reverse selector of the vehicle transmission.

Figure 3:
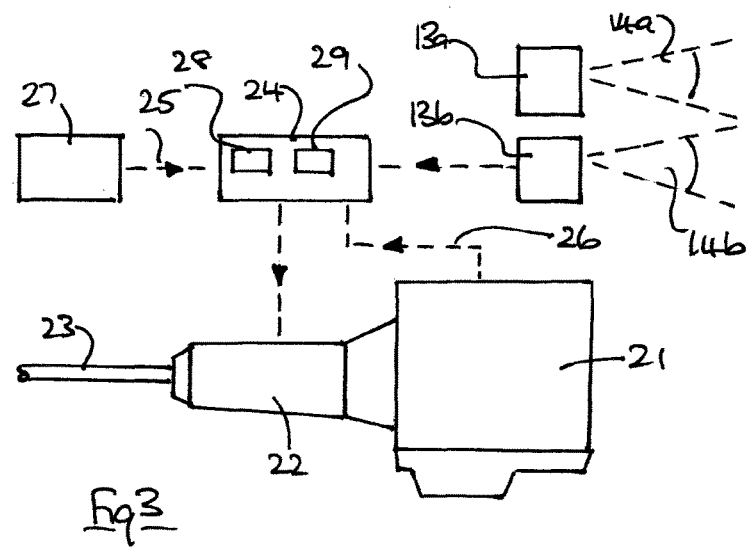
FIG. 3 illustrates schematically the system of the invention.

FIG. 3 illustrates a control system according to the invention.

A vehicle engine 21 has a multi-speed automatic transmission 22 and an output shaft 23. The kind of engine and transmission is not important except that the transmission 22 is capable of selecting two or more different speed ratios for vehicle launch. The transmission may for example be a torque converter transmission having eight or more forward speed ratios. The transmission may be an all-wheel-drive transmission.

A transmission controller 24 determines selection of one of several shift maps for the transmission, according to for example, an input 25 of road speed and an input 26 indicative of accelerator pedal position or torque demand. The input of road speed is from a suitable sensor 27 of road speed of the vehicle such as a wheel speed sensor of an anti-locking braking system (ABS), and may be a digital signal available from a vehicle CAN-BUS or the like. Road speed may also be calculated from instant engine speed by reference to transmission and final drive gear ratios, or from the transmission output speed by reference to the final drive gear ratio. Other inputs may be provided according to terrain type temperature, altitude and other parameters. The transmission controller described so far is of a conventional kind, and is typically implemented in and by a computer processor of the transmission or of the vehicle. The controller 24 may include a computer processor 28, and read only memory 29 for storing a plurality of transmission shift maps.

According to this embodiment of the invention, the output of the camera devices 13, 15 may be processed to recognize a slope or an obstacle. Thus in one embodiment a pair of laterally spaced digital video cameras 13*a*, 13*b* are mounted at the front of a vehicle, facing forwards, and have overlapping fields of view 14*a*, 14*b*. The cameras 13*a*, 13*b* provide a stereo image capable of being processed by conventional means to determine the nature of the terrain in the field of view. For example an artificial horizon may be used to determine slope 12, or image recognition may be used to recognize a kerb 17 (or rocks or similar obstacles).

Having recognized a gradient and/or an obstacle, the controller is adapted to select an appropriate launch ratio for the vehicle so that upon starting from rest the vehicle will be adapted to the terrain. In effect a suitable launch ratio is pre-selected, to the intent that normal accelerator pedal movement will be appropriate to the gradient or obstacle that the vehicle is required to overcome.

In the example of FIGS. 1 and 2, a lower launch ratio may thus be selected (in forwards or in reverse); in the case of a down slope a higher launch ratio may be selected or the vehicle may launch in a ratio appropriate to level ground.

The field of view of the camera device may be selected according to the vehicle and the nature of use thereof. The field of view may be ground intersecting level with the front or rear of the vehicle, may be ground intersecting within the length of the vehicle, or as illustrated be ground intersecting at a distance from the vehicle.

In an embodiment of the invention, the camera device or a processor associated therewith may include a memory for remembering or recalling an obstacle. Thus in one example a kerb may be recognized immediately before parking the vehicle overnight. Upon re-start in the morning, the transmission controller may remember the obstacle by interrogating the memory, and thereby engage an appropriate launch ratio.

In another example, the memory may remember an obstacle which is no longer within the field of view but is determined to be very close to the vehicle by reference to distance travelled by the vehicle. Thus a kerb hidden under a vehicle may be recalled so that vehicle launch in the opposite direction (for example after overnight parking) is in an appropriate launch speed ratio. Distance travelled may for example be determined by counting wheel rotations, and may be a standard input available on a vehicle CAN-BUS or the like.

It would be appreciated that the kind of vehicle automatic transmission is not important except that the two or more different speed ratios for vehicle launch may be provided by any gear ratio configuration of any single unit or combination of units in the vehicle drive line having a plurality of selectable gear ratios. For example a transfer case with a high range and a low range is a type of vehicle automatic transmission. Selecting a launch speed ratio may comprise selecting a gear ratio in the transfer case.

The output of the slope and/or obstacle sensing device may be understood to comprise a signal from a component of the sensing device indicative of the field of view in the direction of intended travel, or at least one parameter from a component of the sensing device concerning a slope and/or obstacle in the path of the vehicle, determined from the signal.

Changes and modifications to the invention are envisaged within the scope of the claims appended hereto.

Aspects and embodiments of the invention will be apparent from the numbered paragraphs that follow:

1. A method of selecting a launch speed ratio in a vehicle automatic transmission having a plurality of selectable speed ratios, the method comprising:
   providing on a vehicle a slope and/or obstacle sensing device looking in the direction of intended travel,
   determining the presence of a slope or the presence of an obstacle, in the path of the vehicle, and
   selecting a launch speed ratio appropriate to the determined slope or obstacle.

2. A method according to aspect 1 and comprising:
   detecting an up-slope exceeding a threshold gradient, and selecting a launch speed ratio lower than normal.

3. A method according to aspect 1 and comprising:
   detecting an obstacle exceeding a threshold height, and selecting a launch speed ratio lower than normal.

4. A method according to aspect 1 and comprising:
   detecting a down slope exceeding a threshold gradient and selecting a launch speed ratio lower than normal.

5. A method according to aspect 4 and comprising:
   detecting a down slope exceeding a threshold gradient and selecting a Hill Descent Control Mode.

6. A method according to aspect 1 and comprising activating said sensing device by using a transmission shift selector to select one of forward and reverse motion.

7. A method according to aspect 1 and comprising recognizing a terrain type for the vehicle, and selecting said launch speed ratio with reference to said terrain type.

8. A method according to aspect 7 and comprising:
   recognizing a non-highway terrain type, and reducing a threshold for launch in a lower speed ratio.

9. A method according to aspect 1 and comprising recognizing a Hill Descent Control mode and reducing a threshold for launch in a lower speed ratio.

10. A method according to aspect 1 and comprising selecting an alternative range of transmission speed ratios, said alternative range including the selected launch speed ratio.

11. A method according to aspect 1 wherein said sensing device comprises one of a camera device, RADAR and LIDAR.

12. A launch control system of a vehicle automatic transmission having a plurality of selectable speed ratios, said system comprising a plurality of transmission shift maps defining two or more launch speed ratios, a slope and/or obstacle sensing device adapted to look in the direction of intended travel and having an output, and a processor adapted to determine from said output the presence of a slope and/or an obstacle, and adapted to select a shift map appropriate to the detected slope and/or obstacle.

13. A system according to aspect 12 wherein said sensing device is a stereo camera.

14. A system according to aspect 13 wherein said stereo camera is a video camera.

15. A system according to aspect 12 wherein said sensing device provides a digital output.

16. A system according to aspect 12 wherein said processor is adapted to determine the value of a slope and/or the height of an obstacle.

17. A system according to aspect 12 incorporated within a vehicle having an automatic multi-speed transmission.

18. A vehicle having a forward and a rearward sensing device, and a launch control system of a vehicle automatic transmission having a plurality of selectable speed ratios, said system comprising a plurality of transmission shift maps defining two or more launch speed ratios, said sensing device being adapted to look in the direction of intended travel and having an output, and said vehicle comprising a processor adapted to determine from said output the presence of a slope and/or an obstacle, and said being adapted to select a shift map appropriate to the detected slope and/or obstacle.

19. A vehicle according to aspect 18 wherein one of the forward and rearward facing sensing devices is selectable according to the position of a transmission shift selector.

The invention claimed is:

1. A method of selecting a launch speed ratio in a vehicle automatic transmission having a plurality of selectable speed ratios, the method comprising:
   detecting at least one of a slope and an obstacle, that will be encountered in the path of a vehicle, in dependence on an output of a sensing device on the vehicle looking ahead of the vehicle in a direction of intended travel, and
   selecting a launch speed ratio based upon at least one of a detected slope and a detected climbable obstacle.

2. A method according to claim 1, comprising:
   detecting an up-slope exceeding a threshold gradient; and
   selecting said launch speed ratio lower than a default launch speed ratio.

3. A method according to claim 1, comprising:
   detecting an obstacle exceeding a threshold height; and
   selecting said launch speed ratio lower than a default launch speed ratio.

4. A method according to claim 1, comprising:
detecting a down slope exceeding a threshold gradient; and
selecting said launch speed ratio lower than a default launch speed ratio.

5. A method according to claim 4, comprising:
detecting a down slope exceeding a threshold gradient; and
selecting a Hill Descent Control Mode that automatically controls the vehicle automatic transmission and an engine of the vehicle to control a hill descent without driver input to an accelerator pedal.

6. A method according to claim 1, comprising activating a forward or rearward sensing device in dependence on a signal indicating which one of forward and reverse motion is selected by a transmission shift selector.

7. A method according to claim 1, comprising
recognizing a terrain type for the vehicle; and
selecting said launch speed ratio with reference to said terrain type.

8. A method according to claim 7, comprising:
recognizing a non-highway terrain type, and reducing a threshold for launch in a lower speed ratio.

9. A method according to claim 1, comprising
recognizing a Hill Descent Control mode that automatically controls the vehicle automatic transmission and an engine of the vehicle to control a hill descent without driver input to an accelerator pedal; and
reducing a threshold for launch in a lower speed ratio.

10. A method according to claim 1, comprising selecting an alternative range of transmission speed ratios, said alternative range including the selected launch speed ratio.

11. A method according to claim 1, wherein said sensing device comprises one of a camera device, a Radio Detection and Ranging device, and a Light Detection and Ranging device.

12. A method according to claim 1, comprising providing on the vehicle the sensing device looking in the direction of intended travel.

13. A method according to claim 1, wherein when the at least one of a detected slope and a detected climbable obstacle is not detected, a launch speed ratio higher than a default launch speed ratio is selected.

14. A method according to claim 1, comprising determining whether the detected climbable obstacle is climbable without excessive accelerator pedal movement, in preparation for at least one of a detected height of the detected obstacle and image recognition, wherein the launch speed ratio is selected in dependence on the determining.

15. A method according to claim 14, wherein the determining is dependent on whether the detected obstacle has a height lower than a curb height threshold.

16. A controller, for a vehicle automatic transmission having a plurality of selectable speed ratios, the controller being configured to carry out the method according to claim 1.

17. A vehicle having an automatic transmission, and incorporating the controller of claim 16.

18. A vehicle according to claim 17, having a forward and a rearward sensing device.

19. A vehicle according to claim 18, wherein one of the forward and rearward facing sensing devices is selectable according to a position of a transmission shift selector.

20. A non-transitory computer readable medium containing a computer program which, when run on a processor, causes at least the method according to claim 1 to be performed.

* * * * *